United States Patent
Farha

[19]

[11] Patent Number: 5,780,128
[45] Date of Patent: Jul. 14, 1998

[54] POLYETHYLENE PREFORM AND CONTAINER

[75] Inventor: Said K. Farha, Chappaqua, N.Y.

[73] Assignee: PepsiCo Inc., Purchase, N.Y.

[21] Appl. No.: 633,951

[22] Filed: Apr. 15, 1996

[51] Int. Cl.⁶ ................................................ B65D 71/00
[52] U.S. Cl. ............... 428/35.7; 428/542.8; 428/36.91; 215/12.2; 220/415
[58] Field of Search ............... 428/35.7, 542.8, 428/36.91; 525/240; 215/12.2; 220/415

[56] References Cited

U.S. PATENT DOCUMENTS 5,030,662  7/1991  Banerjee ..................... 521/43.5
5,073,416  12/1991  Avakian et al. ............... 428/2

FOREIGN PATENT DOCUMENTS 2211165  12/1988  United Kingdom.

*Primary Examiner*—Charles Nold
*Attorney, Agent, or Firm*—Scully, Scott, Murphy & Presser

[57] ABSTRACT

A polymeric composition which comprises post consumer PET and a first virgin PET is employed to form a laminate with a second virgin PET. The laminate is used in forming PET preforms which are blow molded into beverage containers.

12 Claims, 1 Drawing Sheet

POLYETHYLENE PREFORM AND CONTAINER

BACKGROUND OF THE DISCLOSURE

1. Field of the Invention

The instant invention is directed to a polymeric composition which includes post consumer PET and a first virgin PET which comprises a copolymer of ethylene terephthalate and ethylene isophthalate. The instant invention is also directed to a laminate comprising a first ply of the polymeric composition and a second ply of a second virgin PET which constitutes a second copolymer of ethylene terephthalate and ethylene isophthalate. The laminate is used to make preforms later blow molded into beverage containers.

2. Background of the Prior Art

Plastic containers formed of polyethylene terephthalate (hereinafter referred to as "PET") have revolutionized the carbonated beverage industry. That is, container bottles formed of this material have replaced containers made of other materials, such as glass, in all sizes above minimum volume containers, i.e. in excess of 12 ounces. Indeed, in certain parts of the world, PET bottles are now employed as small volume containers and are even contemplated for use as refillable bottles.

This overwhelming commercial acceptance has produced one unfortunate environmental concern. Polyester bottles, specifically PET container bottles, are very stable. Thus, their stability presents a serious environment problem. That is, the disposal of PET bottles after use has perplexed advocates of their use. These non-biodegradable bottles tax waste disposal facilities and have been the subject of many schemes to prevent their accumulation in such facilities. Many jurisdictions, for example, have imposed bottle deposit laws. However, such laws merely insure that the bottles will be returned to a centralized location, they do not solve the problem of their disposal.

The above facts have prompted many technological efforts to develop methods of reusing these PET bottles. One proposed obvious use is as a raw material in the formation of additional carbonated beverage containers.

The use of recycle PET in the formation of carbonated beverage containers provides a substantial advantage in addition to that obtained by the elimination of the problem associated with the removal of these bottles from the environment. That is, an obvious major cost in the manufacture of PET bottles is the cost of the resin itself. Thus, the use of recycle PET reduces the cost of forming such bottles. However, contact with an edible food, such as carbonated beverages, by a container formed of recycle PET is illegal. Government regulations do not allow reprocessed plastic to come in contact with human ingestible food. Thus, the use of bottles formed entirely of recycle PET containers is not possible.

The above remarks suggest the use of a laminate container wherein the outer layer is recycle PET and the inner layer, in contact with the carbonated beverage, is virgin PET. Although such containers are known in the art, these bottles suffer from a major failing associated with bottle clarity. Those skilled in the art are aware that a major advantage of the employment of PET as the material of construction of carbonated beverage bottles is its clarity. The absence of this property in recycle PET laminate bottles represent a serious impediment to their use in this application.

A second problem associated with laminate containers of virgin and recycle PET is the absence of fusibility between the two layers resulting from chemical differences between the layers. Although both plies of the laminate constituting the container are formed of PET, the chemical identity of the recycle composition is unknown. Moreover, the chemical constituency of each recycle batch varies. These problems result from the differences in the source of the recycled PET containers.

It is speculated that independent of the chemical constituency of a given PET recycle batch, that batch is sufficiently different from any virgin PET with which it is laminated so that poor fusibility between the layers occurs. This poor fusibility is manifested by rupture between the laminate layers during blow molding of PET laminate preforms into PET containers.

These problems are particularly critical insofar as a recent development in the processing of recycle PET, as well as other non-virgin PET polymers, to form laminated containers, has provided a manufacturing process permitting the utilization of previously used PET bottles. U.S. Pat. No. 4,942,008 to Cahill describes a process wherein a plastic tube is extruded from a non-virgin PET polymer, usually PET previously fabricated into containers, and cut into sleeves accommodatable in an injection mold. Virgin PET is thereupon injected into the mold such that the virgin PET forms the inner ply of the body portion as well as the sole ply of the remainder of the preform. The product of this injection molding process, a preform, is thereupon blow molded to form a beverage container.

In view of this and other improvements in processing of recycle PET to form laminated carbonated beverage containers the need for improving the clarity and fusibility of such containers represents a pressing urgency in the art.

BRIEF SUMMARY OF THE INVENTION

A new composition has now been developed which permits the utilization of previously used PET in the manufacture of beverage containers. The development of this composition permits the utilization of previously used PET in recently developed processes which permit its easy fabrication by blow molding techniques into clear and leak resistant PET carbonated beverage bottles, by blow molding techniques into clear and leak resistant PET carbonated beverage bottles.

In accordance with the present invention a new polymeric composition has been developed. The composition includes between about 90 wt. % and about 98 wt. % post consumer PET having an intrinsic viscosity of between about 0.67 and about 0.75 and between about 2 wt. % and about 10 wt.% of a first virgin PET, having an intrinsic viscosity in the range of between about 0.77 and about 0.83, said percentages by weight based on the total weight of the composition.

Intrinsic viscosity is determined by disposing a measured amount of solvent in a viscometer. The efflux time, $t_o$, of the solvent, at a controlled temperature, is thereupon determined. A predetermined weighed amount of the polymer whose intrinsic viscosity is to be determined is dissolved, again in the viscometer, in a measured amount of the solvent. The efflux time of the polymeric solution, t, is again determined at the same controlled temperature. The relative viscosity of the polymer is calculated as the ratio of $t/t_o$. A series of relative viscosity values is determined as a function of varying concentrations. The inherent viscosity of the polymer, in ml/g, is determined as $\ln(\eta/\eta_o)/c$, where $\ln(\eta/\eta_o)$ is the natural logarithm of the relative viscosity and c is the concentration of the polymeric solution in ml/g. The intrinsic viscosity of the polymer is determined by plotting inherent viscosity as a function of several concentrations and plotted line when the line intersects the zero concentration point.

In further accordance with the present invention a laminate is disclosed. The laminate comprises a first ply of the above defined polymeric composition and a second ply of a second virgin PET. The second virgin PET is a copolymer of ethylene terephthalate and ethylene isophthalate having an intrinsic viscosity of between about 0.77 and about 0.83.

In yet further accordance with the present invention a preform is described. The preform comprises an open neck portion, formed of said second virgin PET, integrally adjacent a body portion. The body portion comprises an outer layer of said first ply of said laminate and an inner layer of said second ply of said laminate. The preform additionally includes a closed bottom portion, integrally adjacent to the body portion, formed of said second virgin PET.

Finally, in still further accordance with the present invention, a beverage container is provided. The container comprises an open neck portion, a laminated body portion and a closed bottom portion disposed in the same arrangement and of the same polymers as the preform.

BRIEF DESCRIPTION OF THE DRAWINGS

The present invention will be better understood with reference to the drawings of which.

DETAILED DESCRIPTION

Figure 1:
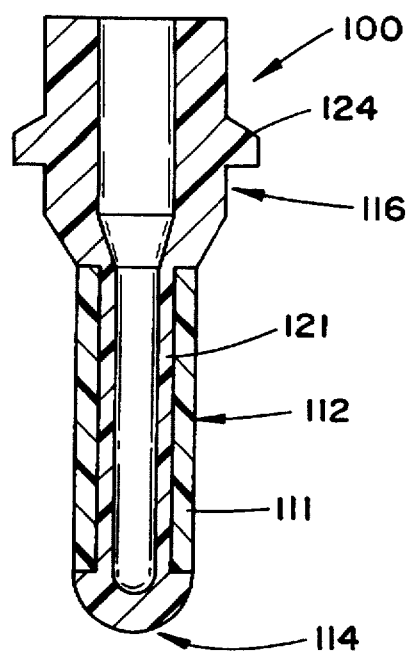
FIG. 1 is a cross-sectional view of a preform of the present invention.
Figure 2:
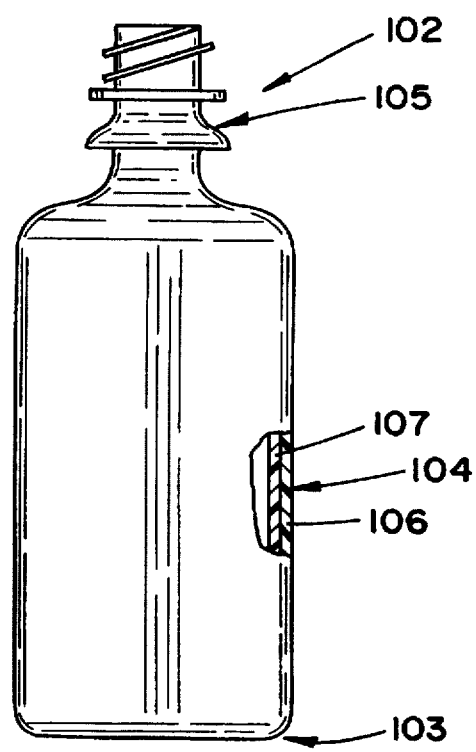
FIG. 2 is a cross-sectional view of a container made from a preform of FIG. 1.

The polymeric composition of the present application includes a major amount of PET recycle and a minor amount of virgin PET. The PET recycle of the present invention is limited to so-called "post consumer PET." As those skilled in the art are aware, post consumer PET is the ground product of previously used polyester beverage containers. The exclusive use of post consumer PET insures that its constituency meets the requirements imposed by governmental agencies charged with the responsibility of insuring that consumer products meet all requisite safety requirements.

Two major problems associated with the utilization of post consumer PET have prevented its widespread commercial use in plastic carbonated beverage containers, and thus overcome the environmental concern associated with their disposal. These problems, discussed above, relate to the lack of clarity and to the tendency toward delamination during blow molding of the preforms.

The present invention represents a major advance in overcoming these problems. Although the invention is independent of any theory explaining its effectiveness, it is speculated that both of these problems are caused by poor adhesivity between the post consumer PET outer layer and the virgin PET inner layer in contact with the carbonated beverage. The post consumer PET outer layer and the virgin PET inner layer in contact with the carbonated beverage. The present invention addresses this difficulty by adjusting the post consumer PET chemical constituency to make it more similar to virgin PET.

To this end post consumer PET, whose constituency varies from batch to batch, is combined with a constant second polymeric component to provide a novel polymeric composition. This second polymeric component, a virgin PET, is denoted for convenience as a first virgin PET to distinguish it from a second virgin PET, discussed below. It is theorized that the inclusion of virgin PET in the post consumer PET improves its compatibility with virgin PET with which it is laminated.

Turning first to the predominant constituent of the polymeric composition, post consumer PET, that constituent combines the disparate constituency of the many compositions utilized in the manufacture of PET carbonated beverage containers. These compositions include different PET homopolymers and copolymers as well as disparate additives, i.e. gas barrier resins and the like. What is uniform about post consumer PET is its lowered degree of polymerization compared to virgin PET. In general, post consumer PET utilized in the composition of the present invention has an intrinsic viscosity in the range of between about 0.67 and about 0.75.

Post consumer PET is prepared by methods well known in the art. There is an abundant number of references, in the technical and patent literature, as well as foreign residue, are removed and the resultant plastic product ground into pellets such that they can be reused in the articles which are commonly fabricated of PET, i.e. molded articles, films and fibers.

The second constituent of the polymeric composition is a first virgin PET. To better understand the constituency of the first virgin PET, as well as the second virgin PET to be discussed hereinafter, it should be understood that so-called polyethylene terephthalate resins are polyesters formed by the polymerization of esters, which themselves are reaction products of an acid and an alcohol.

Polyesters denoted as polyethylene terephthalate are homopolymers or copolymers wherein the repeating structural unit is exclusively or predominantly ethylene terephthalate. An ethylene terephthalate has the repeating structural formula

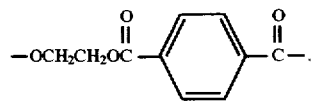

PET copolymers usually include minor concentrations of combinations of other polycarboxylic acids and polyhydroxyl compounds. Thus, while ethylene terephthalate is the product of ethylene glycol and terephthalic acid, copolymer products include the polyester condensation products of such polycarboxylic acids as isophthalic acid, dibenzoic acid, naphthalene 1,4-dicarboxylic acid, naphthalene 2,6-dicarboxylic acid, adipic acid, sebacic acid, decane-1,10-dicarboxylic acid and the like and such polyhydroxyl compounds as diethylene glycol, propane 1,3-diol, butane 1,4-diol, polytetramethylene glycol, polyethylene glycol, polypropylene glycol, cyclohexane dimethanol and the like.

Oftentimes, the copolymer is the reaction product of one of the monomers employed in the formation of ethylene terephthalate, i.e. ethylene glycol or terephthalic acid, reacted with one of the aforementioned acids or alcohols. Thus, a commercially important PET copolymer is a copolymer of ethylene terephthalate and the reaction product of terephthalic acid and cyclohexane dimethanol. In the present invention, the copolymers constituting the first and second virgin PET are copolymers of ethylene terephthalate and ethylene isophthalate. Ethylene isophthalate is the reaction product of isophthalic acid and ethylene glycol.

The first virgin PET is preferably a copolymer of ethylene terephthalate and ethylene isophthalate which comprises between about 80 mole % and about 99 mole % ethylene terephthalate and between about 1 mole % and about 20 mole % ethylene isophthalate, said percentages based on the total molar constituency of the copolymer. More preferably, the copolymer constituting the first virgin PET comprises between about 90 mole % and about 98 mole % ethylene terephthalate and between about 2 mole % and about 10 mole % ethylene isophthalate. Still more preferably, the copolymer includes between about 92 mole % and about 97 mole % ethylene terephthalate and between about 3 mole % and about 8 mole % ethylene isophthalate. Even still more preferably, the first virgin PET copolymer includes between about 95 mole % and about 96.5 mole % ethylene terephthalate and between about 3.5 mole % and about 5 mole % ethylene isophthalate. Most preferably, the first virgin PET is a copolymer of about 96 mole % ethylene terephthalate and about 4 mole % ethylene isophthalate.

The first virgin PET is preferably characterized by an intrinsic viscosity (IV) of between about 0.77 and about 0.83. More preferably, the IV of the copolymer constituting the first virgin PET is in the range of between about 0.78 and about 0.82. Still more preferably, the IV of the first virgin PET is between about 0.79 and about 0.81. Most preferably, the IV of the first virgin PET is about 0.80.

The polymeric composition of the present invention comprising the post consumer PET and the first virgin PET constitutes between about 90 wt. % and about 98 wt. % post consumer PET and between about 2 wt. % and about 10 wt. % first virgin PET wherein the percentages are based on the total weight of the polymeric composition.

Preferably, the composition comprises between about 91 wt. % and about 97 wt. % post consumer PET and between about 3 wt. % and about 9 wt. % of the first virgin PET.

Still more preferably, the polymeric composition of this invention includes between about 92 wt. % and about 96 wt. % post consumer PET and between about 4 wt. % and about 8 wt. % of the first virgin PET.

Yet still more preferably, the polymeric composition of the present invention includes between about 94 wt. % and about 95.5 wt. % post consumer PET and between about 3.5 wt. % and about 6 wt. % first virgin PET.

Most preferably, the polymeric composition comprises about 95 wt. % post consumer PET and about 5 wt. % first virgin PET.

The laminate of the present invention comprises a first layer of the above described polymeric composition and a second layer of a second virgin PET. The second virgin PET is a polyethylene terephthalate homopolymer or copolymer again characterized by the sole or predominate inclusion of ethylene terephthalate repeating units. The second virgin PET has an IV of between about 0.77 and about 0.83. More preferably, the IV of the second virgin PET is in the range of between about 0.78 and about 0.82. Still more preferably, the IV of the second virgin PET is between about 0.79 and about 0.81. Most preferably, the IV of the second virgin PET is about 0.80.

As in the case of the first virgin PET, it is preferred that the second virgin PET be a copolymer of ethylene terephthalate and ethylene isophthalate. More preferably, the copolymer includes between about 95 mole % and about 99.5 mole % ethylene terephthalate and between about 0.5 mole % and about 5 mole % ethylene isophthalate, said percentages based on the total molar constituency of the copolymer.

In a more preferred embodiment the copolymer, which is also referred to as a copolyester, constituting the second virgin PET comprises between about 96 mole % and about 99 mole % ethylene terephthalate and between about 1 mole % and about 4 mole % ethylene isophthalate.

Even more preferably, the second virgin PET comprises between about 97 mole % and about 98.5 mole % ethylene terephthalate and between about 1.5 mole % and about 3 mole % ethylene isophthalate.

Yet still more preferably, the copolyester constituting the second virgin PET encompasses between about 97.5 mole % and about 98.25 mole % ethylene terephthalate and between about 1.75 mole % and about 2.5 mole % ethylene isophthalate.

Most preferably, the second virgin PET is a copolymer of about 98 mole % ethylene terephthalate and about 2 mole % ethylene isophthalate.

The polymeric composition of the present invention is formed into a plastic preform in a first step of first extruding a cylinder of the plastic composition of the present invention. The so extruded cylinder in a second step is cut into sleeves. Each thus prepared sleeve is inserted into an injection mold in accordance with the teaching of U.S. Pat. No. 4,942,008 to Cahill, incorporated herein by reference. Thereupon, the second virgin PET, in molten condition, is injected therein such that it forms the inner surface of the preform. As described in the '008 patent, the disposition of the sleeve, formed of the polymeric composition of the present invention, in the mold results in the fabrication of a preform constituting a laminate body portion wherein the above described first ply is the outer ply thereof. As such, the internal surface of the preform solely constitutes the second ply of the laminate described above. It follows that the polymeric composition of this invention, which is in large part formed of post consumer PET, forms no part of the neck or bottom portion of the preform.

The above remarks are illustrated in FIG. 1 of the drawings wherein a preform in accordance with the present invention is illustrated. Therein, a preform 100, prepared in accordance with the process described in U.S. Pat. No. 4,942,008, includes a body portion 112 comprising an outer layer 111 formed of the polymeric composition of the present invention and an inner layer 121. The inner layer 121 of the laminate body portion 112 is formed of the second virgin PET. The second virgin PET also constitutes the closed bottom portion 114 and the open neck portion 116 which are each integrally adjacent to the body portion 112. The open neck and closed bottom portions of the preform 100 are, of course, not laminated. Rather, these portions of the preform 100 are totally formed of the second virgin PET.

As shown at 124, one or more threads may be provided in the open neck portion 116 to accommodate a container cap after preform 100 is expanded into a bottle, as discussed below.

The preform, as illustrated at 100, is thereupon injection blow-molded into a container designed to contain a carbonated beverage by methods well known in the art. A typical container so formed is depicted at 102. The container 102 includes a laminate body portion 104 having an inner ply 107 of the second virgin PET and an outer ply 106 of the polymeric composition of the present invention. The container also includes a closed bottom portion 103 and an open neck portion 105 formed exclusively of second virgin PET, each integrally adjacent said body portion 104.

The above disclosure is given to illustrate the scope and spirit of the present invention. This disclosure will make apparent, to those skilled in the art, other embodiments and examples. These other embodiments and examples are

What is claimed is:

1. A preform comprising an open neck portion integrally adjacent a laminate body portion integrally adjacent a closed bottom portion; said laminate body portion including an outer ply formed of a polymeric composition comprising a post consumer PET having an intrinsic viscosity of between about 0.67 and about 0.75 and a first virgin PET, which is a copolymer of ethylene terephthalate and ethylene isophthalate, having an intrinsic viscosity of between about 0.77 and about 0.83 and an inner ply of a second virgin PET, which is a copolymer of ethylene terephthalate and ethylene isophthalate, having an intrinsic viscosity of between about 0.77 and about 0.83; said open neck and said closed bottom portions formed of said second virgin PET.

2. A preform in accordance with claim 1 wherein said polymeric composition of said outer ply comprises between about 90 wt. % and about 98 wt. % post consumer PET and between about 2 wt. % and about 10 wt. % first virgin PET, said percentages based on the total weight of said composition; said first virgin PET comprises a copolymer of between about 80 mole % and about 99 mole % ethylene terephthalate and between about 1 mole % and about 20 mole % ethylene isophthalate, said percentages based on the total molar constituency of the copolymer; and said second virgin PET of said open neck portion, said inner ply and said closed bottom portion comprises a copolymer of between about 95 mole % and about 99.5 mole % ethylene terephthalate and between about 0.5 mole % and about 5 mole % ethylene isophthalate, said percentages based on the total molar constituency of said copolymer.

3. A preform in accordance with claim 2 wherein said polymeric composition of said outer ply comprises between about 91 wt. % and about 97 wt. % post consumer PET and between about 3 wt. % and about 9 wt. % first virgin PET; said first virgin PET comprising a copolymer, having an intrinsic viscosity of between about 0.78 and about 0.82, of between about 90 mole % and about 98 mole % ethylene terephthalate and between about 2 mole % and about 10 mole % ethylene isophthalate; and said second virgin PET comprising a copolymer, having an intrinsic viscosity of between about 0.78 and about 0.82, of between about 96 mole % and about 99 mole % ethylene terephthalate and between about 1 mole % and about 4 mole % ethylene isophthalate.

4. A preform in accordance with Claim 3 wherein said polymeric composition of said outer ply comprises between about 92 wt. % and about 96 wt. % post consumer PET and between about 4 wt. % and about 8 wt. % first virgin PET; said first virgin PET comprises a copolymer of between about 91 mole % and about 97 mole % ethylene terephthalate and between about 3 mole % and about 9 mole % ethylene isophthalate; and said second virgin PET comprises a copolymer of between about 97 mole % and about 98.5 mole % ethylene terephthalate and between about 1.5 mole % and about 3 mole % ethylene isophthalate.

5. A preform in accordance with Claim 4 wherein said polymeric composition of said outer ply comprises between about 94 wt. % and about 95.5 wt. % post consumer PET and between about 4.5 wt. % and about 6 wt. % first virgin PET; said first virgin PET comprises a copolymer, having intrinsic viscosity of between about 0.79 and about 0.81, of between about 95 mole % and about 96.5 mole % ethylene terephthalate and between about 3.5 mole % and about 5 mole % ethylene isophthalate; and said second virgin PET comprises a copolymer, having an intrinsic viscosity of between about 0.79 and about 0.81, of between about 97.5 mole % and about 98.25 mole % ethylene terephthalate and between about 1.75 mole % and about 2.5 mole % ethylene isophthalate.

6. A preform in accordance with claim 5 wherein said polymeric composition of said outer ply comprises about 95 wt. % post consumer PET and about 5 wt. % first virgin PET; said first virgin PET comprises a copolymer, having an intrinsic viscosity of about 0.80, of about 96 mole % ethylene terephthalate and about 4 mole % ethylene isophthalate; and said second virgin PET comprises a copolymer, having an intrinsic viscosity of about 0.80, of about 98 mole % ethylene terephthalate and about 2 mole % ethylene isophthalate.

7. A container comprising an open neck portion integrally adjacent a laminate body portion integrally adjacent a closed bottom portion; said laminate body portion including an outer ply formed of a polymeric composition comprising a post consumer PET having an intrinsic viscosity of between about 0.67 and about 0.75 and a first virgin PET, which is a copolymer of ethylene terephthalate and ethylene isophthalate, having an intrinsic viscosity of between about 0.77 and about 0.83 and an inner ply of a second virgin PET, which is a copolymer of ethylene terephthalate and ethylene isophthalate, having an intrinsic viscosity of between about 0.77 and about 0.83; said open neck and said closed bottom portions formed of said second virgin polymer.

8. A container in accordance with claim 7 wherein said polymeric composition of said outer ply comprises between about 90 wt. % and about 98 wt. % post consumer PET and between about 2 wt. % and about 10 wt. % first virgin PET, said percentages based on the total weight of said composition; said first virgin PET comprises a copolymer of between about 80 mole % and about 99 mole % ethylene terephthalate and between about 1 mole % and about 20 mole % ethylene isophthalate, said percentages based on the total molar constituency of the copolymer; and said second virgin PET of said open neck portion, said inner ply and said closed bottom portion comprises a copolymer of between about 95 mole % and about 99.5 mole % ethylene terephthalate and between about 0.5 mole % and about 5 mole % ethylene isophthalate, said percentages based on the total molar constituency of said copolymer.

9. A container in accordance with claim 8 wherein said polymeric composition of said outer ply comprises between about 91 wt. % and about 97 wt. % post consumer PET and between about 3 wt. % and about 9 wt. % first virgin PET; said first virgin PET comprising a copolymer, having an intrinsic viscosity of between about 0.78 and about 0.82, of between about 90 mole % and about 98 mole % ethylene terephthalate and between about 2 mole % and about 10 mole % ethylene isophthalate; and said second virgin PET comprising a copolymer, having an intrinsic viscosity of between about 0.78 and about 0.82, of between about 96 mole % and about 99 mole % ethylene terephthalate and between about 1 mole % and about 4 mole % ethylene isophthalate.

10. A preform in accordance with Claim 9 wherein said polymeric composition of said outer ply comprises between about 92 wt. % and about 96 wt. % post consumer PET and between about 4 wt. % and about 8 wt. % first virgin PET; said first virgin PET comprises a copolymer of between about 91 mole % and about 97 mole % ethylene terephthalate and between about 3 mole % and about 9 mole % ethylene isophthalate; and said second virgin PET comprises a copolymer of between about 97 mole % and about 98.5 mole % ethylene terephthalate and between about 1.5 mole % and about 3 mole % ethylene isophthalate.

11. A container in accordance with Claim 10 wherein said polymeric composition of said outer ply comprises between about 94 wt. % and about 95.5 wt. % post consumer PET and between about 4.5 wt. % and about 6 wt. % first virgin PET; said first virgin PET comprises a copolymer, having intrinsic viscosity of between about 0.79 and about 0.81, of between about 95 mole % and about 96.5 mole % ethylene terephthalate and between about 3.5 mole % and about 5 mole % ethylene isophthalate; and said second virgin PET comprises a copolymer, having an intrinsic viscosity of between about 0.79 and about 0.81, of between about 97.5 mole % and about 98.25 mole % ethylene terephthalate and between about 1.75 mole % and about 2.5 mole % ethylene isophthalate.

12. A preform in accordance with claim 5 wherein said polymeric composition of said outer ply comprises about 95 wt. % post consumer PET and about 5 wt. % first virgin PET; said first virgin PET comprises a copolymer, having an intrinsic viscosity of about 0.80, of about 96 mole % ethylene terephthalate and about 4 mole % ethylene isophthalate; and said second virgin PET comprises a copolymer, having an intrinsic viscosity of about 0.80, of about 98 mole % ethylene terephthalate and about 2 mole % ethylene isophthalate.

* * * * *

UNITED STATES PATENT AND TRADEMARK OFFICE
CERTIFICATE OF CORRECTION

PATENT NO. : 5,780,128
DATED : July 14, 1998
INVENTOR(S) : Said Farha

It is certified that error appears in the above-identified patent and that said Letters Patent is hereby corrected as shown below:

Title page,
Item [56] References Cited, U.S. PATENT DOCUMENTS, insert
-- 4,942,008    07/1990    Cahill
5,628,957    05/1997    Collette, et al. --

Signed and Sealed this

Thirtieth Day of October, 2001

Attest:

NICHOLAS P. GODICI
Attesting Officer    Acting Director of the United States Patent and Trademark Office